Figure 1:
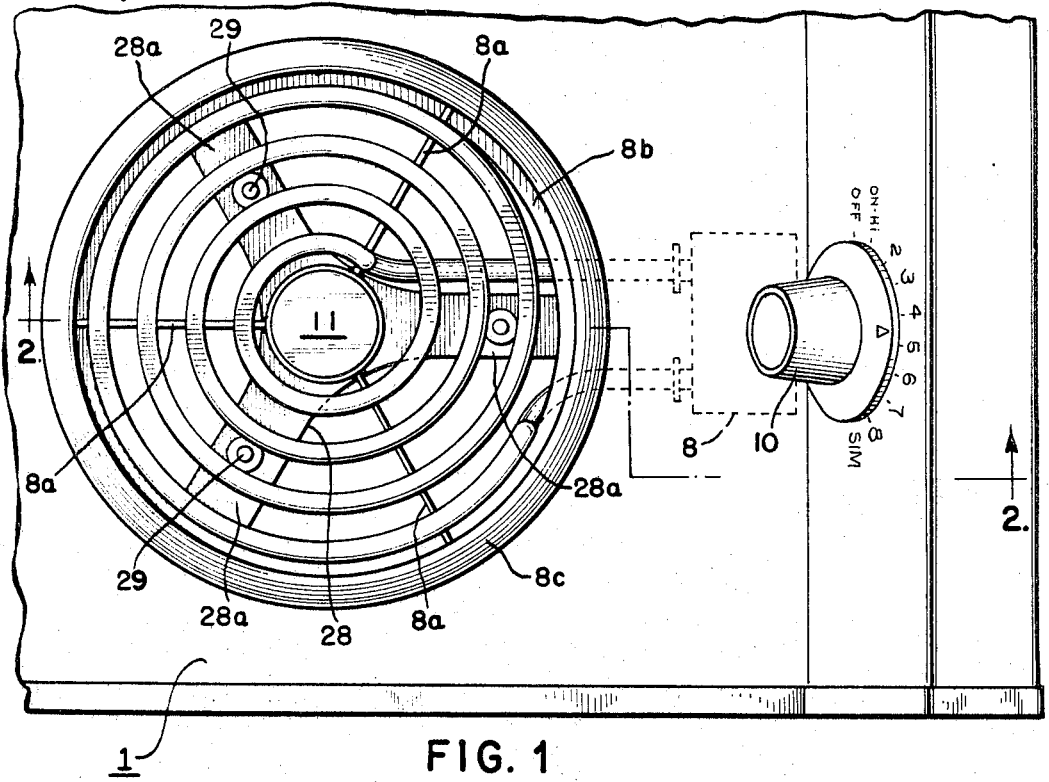

May 21, 1968 — H. K. LINGER — 3,384,735
SURFACE HEATING DEVICE
Filed April 29, 1966 — 2 Sheets-Sheet 1

INVENTOR.
Harrison K. Linger
BY
Attorney

May 21, 1968    H. K. LINGER    3,384,735
SURFACE HEATING DEVICE
Filed April 29, 1966    2 Sheets-Sheet 2
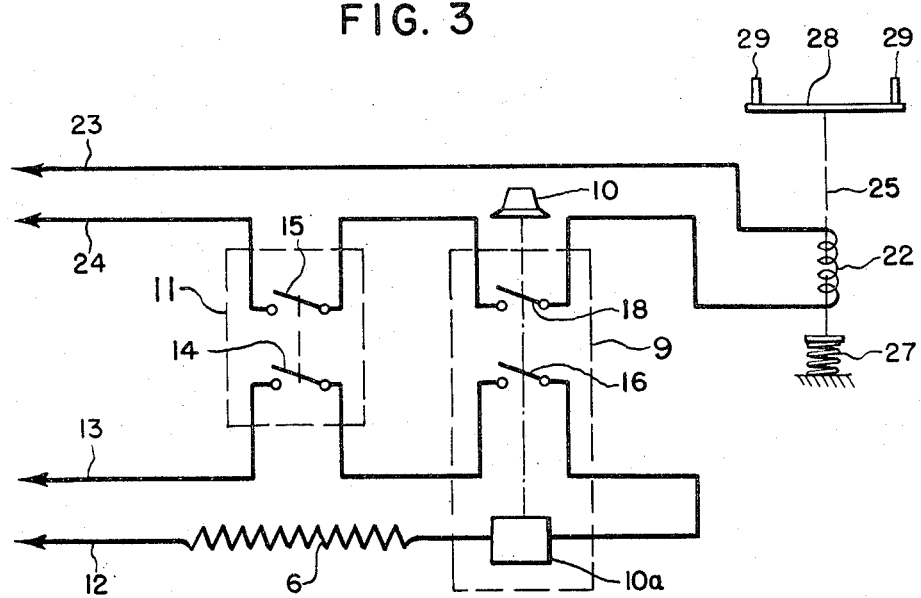
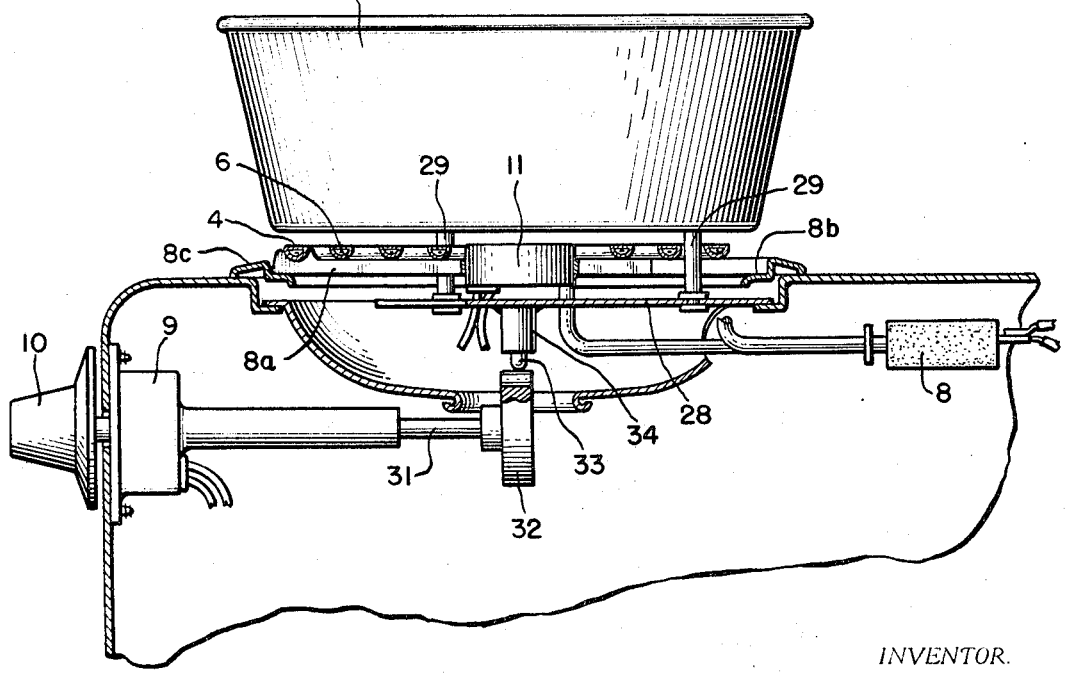
INVENTOR.
Harrison K. Linger
BY
Attorney United States Patent Office 3,384,735
Patented May 21, 1968

3,384,735
SURFACE HEATING DEVICE
Harrison K. Linger, Wheaton, Ill., assignor to General Electric Company, a corporation of New York
Filed Apr. 29, 1966, Ser. No. 546,445
12 Claims. (Cl. 219—456)

This invention relates to surface heating devices, and more particularly to such devices which provide a hot surface on which a cooking vessel may be placed so that the contents of the vessel are then cooked primarily by conduction of heat from the supporting surface to the vessel.

There are many advantages to cooking by use of a hot surface which transfers heat to a cooking vessel by conduction, as opposed to the use of, for example, an open flame. For instance, there is no danger of extinguishing the flame, nor are there products of combustion. In the past there has, however, been the aspect, which some may consider a drawback, that the heating surface remains hot, because of thermal inertia, after the energization of the heating means has stopped. As a result, it takes a more experienced operator to make sure that overheating or boiling over do not occasionally happen.

A related application Ser. No. 546,446 of Peter Nowosielski, assigned to the assignee of my present invention is being filed concurrently herewith.

It is, consequently, an object of my invention to retain all the advantageous features associated with a heated cooking surface while providing, in addition, the advantage that substantially all heat ceases to be transmitted to the cooking vessel as soon as desired, regardless of whether thermal inertia causes residual heat to be present in the cooking surface.

A further more specific object of my invention is to achieve this goal by causing an actual vertical separation of the cooking vessel and the heating surface when heat is not being supplied to the heating surface.

In carrying out my invention in one form thereof, I provide a surface heating device wherein there is a generally flat upper surface intended to contact the cooking vessel for heating primarily by conduction between the surface and the vessel. Suitable means are provided for causing heating of this upper surface, with an on-off system controlling the operation of the heating means so as to determine whether energy is to be supplied for heating purposes or not. Independently of this upper surface, support means are provided for supporting the vessel, and my invention contemplates the provision of means to change the vertical spacing of the independent support means and of the surface: when the on-off system is in its "on" condition, the heating surface is caused to be at least as high as the independent support means so that it may have substantial contact with a cooking vessel for heating by conduction; in the "off" condition of the on-off system, vertical spacing of the independent support means and the surface is provided, with the independent support means being above the surface to hold the cooking vessel in spaced relation to the surface. The result of this latter arrangement is to prevent any heat from being transmitted from the surface to the cooking vessel by conduction. Since, in this type of a system, conduction is the main means for transfer of heat, the heating of the vessel and its contents is effectively stopped.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

Figure 2:
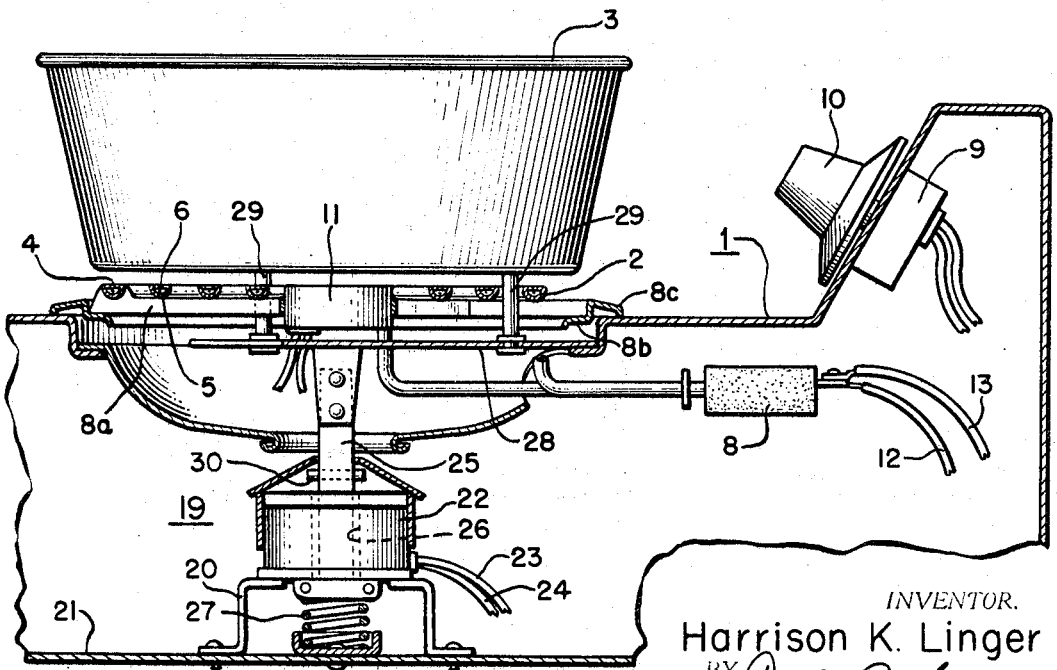

In the drawings:
FIGURE 1 is a plan view illustrating a surface heating device incorporating my invention;
FIGURE 2 is a view along line 2—2 in FIGURE 1;
FIGURE 3 is a simplified electrical diagram illustrating the control system for the electrical resistance heating unit of a surface heating device; and
FIGURE 4 is a side elevational view illustrating a second embodiment of my invention.

Referring now to FIGURES 1 and 2, there is shown a surface section 1 of a conventional domestic electric range wherein several surface heating devices, such as the one shown at 2, may be provided in order to effect cooking. The cooking is effected by conduction of heat to cooking vessels, such as the one shown at 3, which may be placed upon the surface 4 of heating device 2. One conventional means for forming the heating surface is to provide a spiral sheathed tubular heater which includes, as shown in FIGURE 2, an outer sheath 5 and an inner resistance heater coil 6 which are maintained in spaced relation by a suitable filling of thermally conductive electrically non-conductive material such as magnesium oxide. The upper surface of sheath 5 provides the surface 4 in a generally horizontal plane. The terminals 7 of the heater may be connected, through a conventional terminal block 8, to a suitable source of power, as will be further explained herebelow.

The upper surface 4 provided by the sheath 5 provides a substantial amount of contact area with cooking vessel 3 when such a cooking vessel is placed upon it. In this manner, when coil 6 is energized, there is a very substantial transfer of heat by conduction from the upper surface 4 of the heating element to the cooking vessel 3. It will, of course, be understood that the specific structure of the means for achieving the heating surface 4 is described only for purposes of illustration, and that heating surfaces obtained in other ways may readily be used. For instance, another commercially-provided means for providing a surface which cooks primarily by conduction is to form the entire surface of a single smooth piece of material (either completely flat, or provided with a very slight concave curvature to match the bottom of most cooking vessels) with the heating structure being provided therebelow, so that the cooking vessel seats upon a substantially smooth surface rather than one having the spiral appearance best seen in FIGURE 1.

The terminal block 8 may be supported by any suitable means (not shown). The heating element, with its upper surface 4, is retained in the position shown in FIGURES 1 and 2 by support arms 8a whose ends rest on an inwardly extending flange 8b of a ring 8c in turn supported on surface section 1.

Energization of the heating coil 6 is achieved through a conventional on-off system such as a switch mechanism 9 controlled by a manually-operable member 10. Conventionally, such switch mechanism is of the type which permits various levels of energization of coil 6 so that various heating rates may be provided. For the sake of simplicity, switch 9 has been shown in FIGURE 3 as a structure which achieves heat variation through a conventional oscillator mechanism 10a, of the type in common usage. Such mechanisms operate by varying the proportion of circuit-completion time to the proportion of circuit-open time so as to control the amount of energy used to heat coil 6. It will be understood that other approaches may also be used, and are intended to be included within the scope of my invention.

Also shown in FIGURES 1 and 2 is a thermal sensing device 11 which may be of any conventional construction as provided in many commercially available domestic ranges. Device 11 functions to shut off the energization of coil 6 when it senses a predetermined temperature of the cooking vessel 3. The specific switches controlled by manual control structure 9 and thermally responsive control structure 11 are shown in a simplified and schematic manner in FIGURE 3.

Coil 6 may be connected (through terminal block 8) to conductors 12 and 13 which are adapted to be connected across a source of 240 volts alternating current. The thermal element 11 may include a switch 14 which is in series with coil 6 and directly controls the energization thereof, and further may include a switch 15 for a purpose to be hereinafter described. Manual control structure 9, as controlled by the knob 10, may include a switch 16 in series with switch 14 and with coil 6, a connection to oscillating mechanism 10a for permitting variation of the heat in the relatively simple manner previously mentioned, and a switch 18 for a purpose to be hereinafter described.

It can readily be seen that when switches 14 and 16 are closed, and knob 10 is adjusted to provide the desired setting for mechanism 10a, then energization on the selected basis across 240 volts will occur for the heating element 6. Opening of either of switches 14 or 16, under the influence respectively of temperature or manual operation, will stop the energization of coil 6.

Directly below heating device 2 there is provided a solenoid, generally indicated by the numeral 19, which may be rigidly mounted on a bracket 20 secured to portion 21 of the range. Solenoid 19 includes, in the usual manner, a coil 22 energizable through wires 23 and 24 so as to have an electromagnetic effect on a plunger 25, pulling it down into the opening 26 in coil 22 against the action of spring 27. Normally the spring 27 biases the plunger upwardly.

Secured at the top end of the plunger is a platform member 28 which has three arms 28a extending outwardly. Each arm has a support pin 29 extending up therefrom with their tops substantially in a horizontal plane. In other words, as shown in FIGURE 1, the platform is substantially triangular with each support pin mounted on an arm extending from the central portion of the support. Platform 28 is guided in a straight up and down motion by any appropriate means; for instance, the plunger 25 may be supported for purely vertical motion, as shown, with the platform rigidly secured above it. When coil 22 is not energized, spring 27, which is strong enough to overcome the weight of any conventional cooking vessel, forces the plunger 25 of the solenoid upwardly. This raises platform 28 and pins 29 to the position shown wherein the pins are spaced slightly above the heating surface 4. The pins 29 form, in effect, supporting means independent of surface 4 which, when the solenoid is deenergized, will support a cooking vessel 3 in spaced relation to the heating surface 4 as a result of the vertical spacing of the tops of pins 29 above the surface 4.

While the vertical spacing thus achieved is not particularly great, it must be recalled that the nature of heating surface 4 is to provide by far the major part of its heat by conduction, so that a very small space between the cooking vessel and the heating surface results in an almost complete absence of further heat transfer once the heating source is deenergized.

When the solenoid is energized, the plunger 25 is pulled down into the coil with the plunger stop 30 limiting the amount of motion thus provided. This downward movement pulls platform 28 down, and as a result the pins 29 are pulled down until they are just at or slightly below the level of surface 4. When this occurs, the cooking vessel 3 then moves down with the pins 29 until it seats upon surface 4 for a cooking operation by conduction of heat from the surface to the cooking vessel.

It will readily be seen that with the structure thus far described, there are two basic aspects which may be incorporated in this spacing of the cooking vessel from the heating surface. First, it may be done manually as a result of the deenergization of the coil 6 by control 10. Second, it may be done automatically as a result of the deenergization of coil 6 by member 11. In either event, the point is that when coil 6 is no longer energized, the spacing of the cooking vessel from the heating surface prevents any residual heat from being conducted into the cooking vessel.

Thus, if the person controlling the cooking operation wishes to terminate it, the movement of knob 10 to the "off" position will not only terminate energization of coil 6, but will also eliminate virtually any further transfer of heat to the cooking vessel. As is well known, there are many cooked food items for which the exact amount of heat input, and the exact time at which the heat input is stopped, are critical; in such cases the immediate termination of heating of the vessel, regardless of the fact that there may still be some residual heat at surface 4, is of very substantial value. The same is true as to the control by thermal unit 11. There are many foods which must be cooked at very precise temperatures and it is very advantageous for all heat input to a cooking vessel to terminate in response to the provision of a signal to unit 11 that the desired temperature has been reached and should not be exceeded.

It will be understood that the invention may be used in connection with either the manually operated structure or the automatically operated structure, or both. It is further to be understood that while an ordinary movement of the manual structure to the off position is the preferred approach for achieving the desired goal, a special position may be provided, such as "Instant Cool," on the other side of the "off" position from the "on" position. In such a case, a conventional rearrangement of the elements so as to provide spacing of the cooking vessel from the heating surface in response to energization of the solenoid rather than deenergization could be provided, and it is to be recognized that this is within the broad scope of my invention.

It is further to be recognized that the particular number or arrangement of the elements 29 is not significant as long as they provide a supporting function for vessel 3 in at least one of their two possible positions. While it is preferable that elements 29 be capable of fully supporting vessel 3, in the broader aspect of the invention the independent supporting function might even be achieved simply by having a single member 29, or two such members, so that the pan is tilted slightly, with just one edge resting on surface 4. Again, the conductive path, through which most heat transfer is achieved, would be almost completely eliminated.

Referring now to FIGURE 4, there is shown a second embodiment of my invention wherein parts identical to those of the embodiment of FIGURES 1, 2 and 3 are shown by the same numerals. Specifically, there is a movable platform 28, carrying elements 29, to permit the raising of a cooking vessel 3 above surface 4, as before. Also as before, a manually controlled member 10 operates a structure 9 which includes the on-off switch 16 of FIGURE 3 and the heat control mechanism 10a previously described.

In this embodiment, however, the manual control member 10 is preferably positioned at the front of the surface section 1, and rotation of member 10 directly causes rotation of a shaft extension 31. At the end of shaft extension 31 there is provided a cam 32 on which rests the base 33 of a member 34 secured to the platform 28. Base 33 is in effect a cam follower, and cam 32 is formed so that there is no change at all in the position of follower 33 in any "on" position of knob 9. However, when the knob is moved to its off position, a rise on the cam lifts up the follower. As a result, the entire platform 28 is lifted up, with the previously described result that the elements 29 raise vessel 3 out of contact with surface 4.

It can readily be seen that this provides a structure wherein, rather than using an electrically-provided force through a solenoid, the energy for raising vessel 3 is provided by the operator in the same action which effects the "on" and "off" motion of the switch. In other words, when the switch is turned on the vessel 3 is allowed by cam 32 to come down into contact with surface 4, and when the switch is turned off, the vessel is automatically raised out of contact with surface 4. Of course, any appropriate structure for providing a mechanical advantage may be provided, if so desired, to reduce the effort required by the operator; this is particularly feasible in view of the small spacing which has been found suitable to effect the purposes of the invention.

In summary, it will readily be seen that my invention retains all of the advantages of electric cooking in that there is no open flame, and there are no products of combustion to contend with; in addition, the very substantial advantage is provided of instantly reducing the transfer of heat to the cooking vessel almost to zero level in response to the deenergization of the heating source.

While in accordance with the patent statutes I have described what at present is considered to be the preferred embodiment of my invention, it will be obvious to those skilled in the art that various changes and modifications may be made therein without departing from the invention. Thus, it is aimed in the appended claims to cover all such equivalent variations as fall within the true spirit and scope of my invention.

What I claim as new and desire to secure by Letters Patent of the United States is:

1. A surface heating device comprising:
    (a) means for providing a generally flat upper surface intended to contact a cooking vessel for heating primarily by conduction;
    (b) independent support means for supporting the vessel;
    (c) means for causing heating of said upper surface;
    (d) an on-off system for controlling operation of said heating means; and
    (e) means responsive to said on-off system for changing the vertical spacing of said independent means and said surface;
        (i) said changing means causing said surface to be at least as high as said independent support means in the "on" condition of said on-off system;
        (ii) said changing means providing vertical spacing of said independent support means and said surface in the "off" condition of said on-off system, with said independent support means above said surface, whereby heat conduction from said upper surface to the vessel is substantially interrupted.

2. The device defined in claim 1 wherein said independent means includes at least three spaced support members having their tops substantially in a horizontal plane, said support members being positioned to extend up through openings in said surface.

3. The device defined in claim 1 wherein said changing means comprises a solenoid.

4. The device defined in claim 3 wherein said solenoid provides vertical spacing of said independent support means and said surface when it is deenergized and causes said surface to be at least as high as said independent support means when it is energized.

5. The device defined in claim 1 wherein said on-off system is manually controlled.

6. The device defined in claim 1 wherein said on-off system is thermally controlled.

7. The device defined in claim 1 wherein said means providing a venerally flat upper surface is provided as a sheathed resistance type heater formed into a spiral in a substantially horizontal plane, said independent means extending up through the spaces between adjacent turns of said spiral.

8. The device defined in claim 1 wherein said changing means comprises a solenoid located directly beneath said means providing a generally flat upper surface, said solenoid having a plunger and a spring biasing said plunger to an upward position, said plunger supporting said independent means, said solenoid when energized pulling said plunger down against the bias of said spring.

9. The device defined in claim 1 wherein said independent means moves upwardly in order to provide the vertical spacing of said independent support means above said surface.

10. The device defined in claim 9 wherein said solenoid is secured to said independent support means.

11. The device defined in claim 1 wherein said on-off system is manually controlled and includes a manually operable member, and said changing means is mechanically connected to said manually operable member so as to be operated thereby.

12. The device defined in claim 11 wherein a cam member is connected to said manually operable member for operation thereby, and a cam follower is connected to said independent support means to control movement thereof.

References Cited

UNITED STATES PATENTS 2,733,332   1/1956   Mason _____ 219—456

BERNARD A. GILHEANY, *Primary Examiner.*

F. BELL, *Assistant Examiner.*